United States Patent

McConnaughay et al.

(10) Patent No.: US 11,979,292 B1
(45) Date of Patent: May 7, 2024

(54) VIRTUAL NETWORK INTERFACE MANAGEMENT FOR NETWORK FUNCTIONS USING NETWORK DEFINITIONS

(71) Applicant: CA, Inc., San Jose, CA (US)

(72) Inventors: Mark McConnaughay, Waterloo (CA); Ronald Andrew Frederick, Mountain View, CA (US); Szaniszlo Tyler Szepesi, Kitchener (CA)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 18/081,533

(22) Filed: Dec. 14, 2022

(51) Int. Cl.
*H04L 41/0894* (2022.01)
*H04L 9/40* (2022.01)
*H04L 45/24* (2022.01)

(52) U.S. Cl.
CPC ........ *H04L 41/0894* (2022.05); *H04L 45/245* (2013.01); *H04L 63/10* (2013.01)

(58) Field of Classification Search
CPC . H04L 63/0263; H04L 63/0236; H04L 63/20; H04L 63/102; H04L 63/101; H04L 63/10
See application file for complete search history.

(56) References Cited

U.S. PATENT DOCUMENTS

| | | | |
|---|---|---|---|
| 9,489,224 B2 | 11/2016 | Motoki | |
| 10,321,381 B2 | 6/2019 | Jiang et al. | |
| 10,938,642 B2 | 3/2021 | Huang et al. | |
| 2003/0223378 A1* | 12/2003 | Ishwar | H04L 47/2441 370/254 |
| 2005/0076138 A1* | 4/2005 | Sterne | H04L 45/60 709/238 |
| 2006/0274750 A1* | 12/2006 | Babbar | H04L 45/308 370/390 |
| 2009/0144804 A1* | 6/2009 | Idicula | G06F 21/6218 726/2 |
| 2010/0100930 A1* | 4/2010 | King | H04L 63/1433 726/1 |

(Continued)

FOREIGN PATENT DOCUMENTS

EP 2890052 A1 7/2015

OTHER PUBLICATIONS

Symantec, "Integrated Secure Gateway 2.4," retrieved Sep. 28, 2022.

*Primary Examiner* — David R Lazaro
(74) *Attorney, Agent, or Firm* — Foley & Lardner LLP

(57) ABSTRACT

Network rules established on a device can establish communication protocol between applications running on the device and interfaces connected to the device. For example, a network rule can establish which application(s) can access which interface(s), and when an application is not assigned to an interface, the application is not granted network access to the interface(s). In some instances, interfaces can be aggregated together to create an aggregation (e.g., link aggregation or a bridge aggregation), thus allowing the network rule to use the aggregation for multiple applications. An aggregation, such as a link aggregation, can be established as a shared rule that allows access to the interface by multiple applications. Alternatively, an aggregation, such as a bridge aggregation, can be established as a reserve rule that permits only a particular application, and no other application(s), access to the interface.

20 Claims, 5 Drawing Sheets

(56) References Cited

U.S. PATENT DOCUMENTS

| | | | |
|---|---|---|---|
| 2011/0153671 A1* | 6/2011 | Taniguchi | G06F 21/604 |
| | | | 707/786 |
| 2013/0042124 A1* | 2/2013 | Isozaki | H04L 63/20 |
| | | | 713/310 |
| 2013/0074066 A1* | 3/2013 | Sanzgiri | H04L 49/70 |
| | | | 718/1 |
| 2015/0222697 A1* | 8/2015 | Bassiouny | H04L 65/65 |
| | | | 709/203 |
| 2019/0173766 A1 | 6/2019 | Schwengler et al. | |
| 2019/0306194 A1* | 10/2019 | Benson | H04L 63/102 |
| 2021/0311762 A1* | 10/2021 | Shepherd | G06F 9/45558 |
| 2023/0069738 A1* | 3/2023 | Sreedhar | H04L 63/101 |
| 2023/0131348 A1* | 4/2023 | Landerholm | H04L 9/0877 |
| | | | 713/168 |

* cited by examiner

VIRTUAL NETWORK INTERFACE MANAGEMENT FOR NETWORK FUNCTIONS USING NETWORK DEFINITIONS

TECHNICAL FIELD

This application is directed to network interface management, and more particularly, to creating network rules that permit or restrict access to interfaces.

BACKGROUND

For gateways, including an integrated secure gateway (ISG), several applications can be launched on an appliance. For each application to run in accordance with an objective, an interface should be assigned to each application. In some instances, an interface may be labeled as a dedicated interface. These dedicated interfaces cannot be shared or used by other applications deployed on the ISG. The management of network interfaces to applications can be complicated when these unique deployment characteristics are used.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
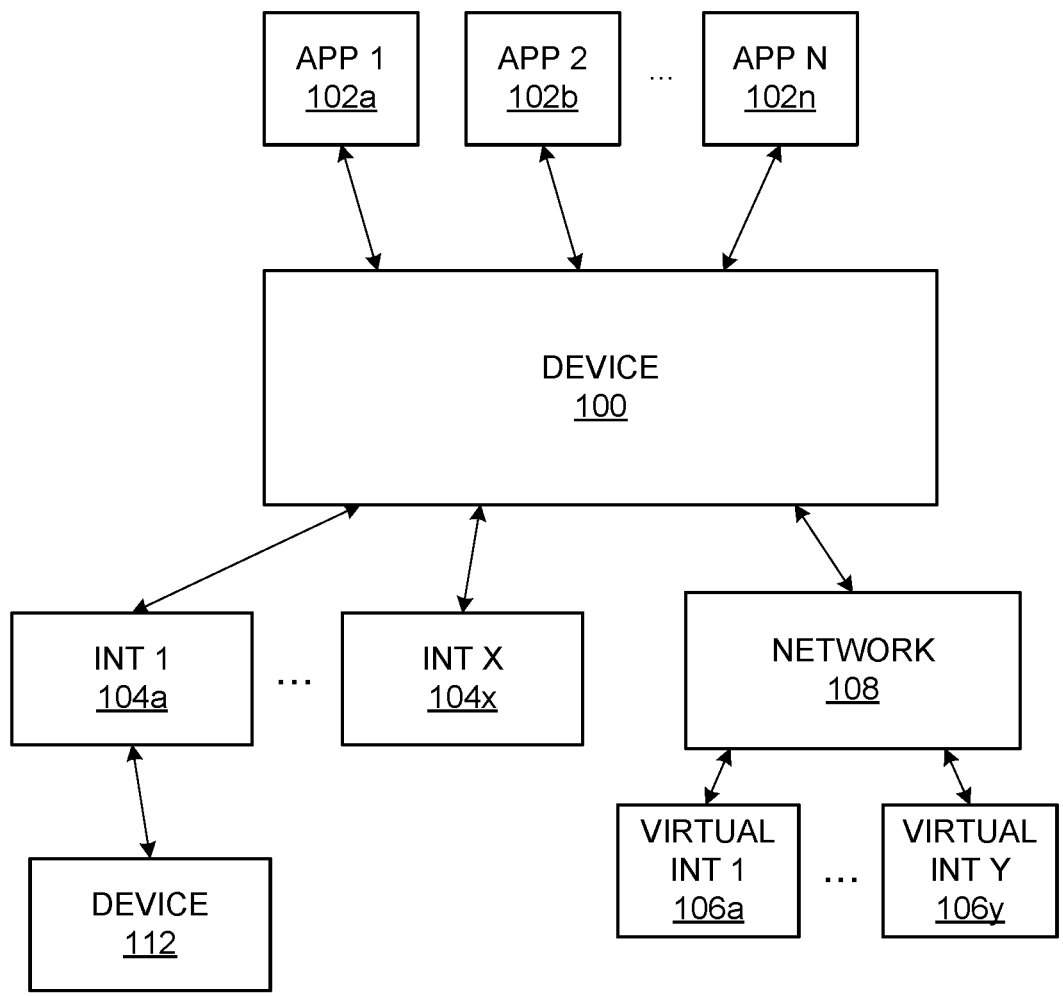
FIG. 1 illustrates a schematic diagram of a device, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure is directed to creating network rules, or network definitions, that manages network access for each application running on a device to communicate with various interfaces that are connected to the device. A device described herein may include a network appliance, such as a server (e.g., rack mounted server), as a non-limiting example. An application may include an executable program (e.g. software application) running on the device. An interface may include a physical interface (e.g., Ethernet-connected device such as a router, a switch, or third party server) or a virtual interface that represents a physical interface. A network rule assigned to an application grants the application with access to at least one interface. The term "access" or phrase "network access" may include permission to communicate (e.g., send and receive data) with an interface. Moreover, when the network rule does not establish access to one or more interfaces, the application may not communicate with the one or more interfaces. Accordingly, a network rule may include a customized network rule created by a user for a particular application to access a particular interface or particular set of interfaces, while also preventing the application from accessing other interfaces.

Prior to creating a customized network rule, a default network rule is automatically assigned to each application on the device. Put another way, each application is automatically assigned to the default network rule prior to establishing, for example, a customized network rule to be assigned to the application. The terms "assign," "assigned," "assignment," and "assigning" refer to designating or setting something aside for a purpose. For example, when a network rule is assigned to an application(s), the purpose of the network rule is to determine and/or manage which interface(s) the application(s) can access. Managing access may include allowing the application to access the interface or preventing the application from accessing the interface. The default network rule grants each application running on the device access to either i) any of the interfaces or ii) a set of preselected interfaces in communication with the device. However, as customized network rules are created, the access by an application to one or more interfaces may change. For example, an application assigned to a customized rule may be removed from the auto network rule. Also, each interface can be assigned a mode. For example, one or more interfaces can be aggregated together as a set, or group, thus allowing a network rule to easily use and re-use the aggregation for other customized rule, allowing different applications to share and access the set of interfaces. Moreover, in some embodiments, an aggregation requires the communication (e.g., data packets) to first pass through the application, and receive approval by the application, before the communication is sent to the other interface(s). Additionally, an interface can be assigned a "reserve" status such that the interface, when assigned to an application, can only be accessed by the application and no other application can access the interface.

These and other embodiments are discussed below with reference to FIGS. 1-5. However, those skilled in the art will readily appreciate that the detailed description given herein with respect to these Figures is for explanatory purposes only and should not be construed as limiting.

According to some embodiments, for example as shown in FIG. 1, a device 100 provides a gateway device for handling data transfer between several applications and several interfaces. In some embodiments, the device 100 includes a host device such as a network appliance or a server (e.g., rack-mount server). However, it should be noted that the device 100 can take different forms of computing devices.

As shown, an application 102a (APP 1), an application 102b (APP 2), and an application 102n (APP N) represent n applications. Each application of the n application may represent a network function running on the device 100. As non-limiting examples, each application (as well as other applications described herein) of the n application may include a secure gateway application, a content analysis software application, or a malware analysis application. A secure gateway application allows user to browse the Internet in a more private manner through changing an Internet protocol (IP) address. A content analysis software application may run data packets through one or more antivirus engines to check for viruses. A malware analysis application may run suspicious content through, for example, a virtual machine by a "sandboxing" operation.

Also, several interfaces are shown, with each interface being capable of communication with one or more of the n applications based upon network rules, which will be shown and described in further detail below. As shown, an interface 104a (INT 1) and an interface 104x (INT X) represents x physical interfaces. The x physical interfaces may represent hardware (e.g., router, a switch, or third party server) connected to the device 100 by, for example, an RJ-45 Ethernet connection. Additionally, a virtual interface 106a (VIRTUAL INT 1) and a virtual interface 106y (VIRTUAL INT Y) represents y virtual interfaces. The y virtual interfaces may include virtual representations of physical interfaces. As shown, the y virtual interfaces are connected to the device 100 by a network 108, which may include an Internet-based network or cloud-based network.

Based on various network rules shown and described herein, some applications of the n applications can be granted network access and communicate with at least some interfaces of the x physical interfaces and y virtual interfaces. Also, based on their design and function, any of the interfaces (physical or virtual) may connect to another device. For example, as shown in FIG. 1, the interface 104a is connected to a device 112. The device 112 may include a network appliance (e.g., server) or a computer terminal, as non-limiting examples. When a network rule permits access by an application to an interface, the permitted application may also communicate with the device 112.

Figure 2:
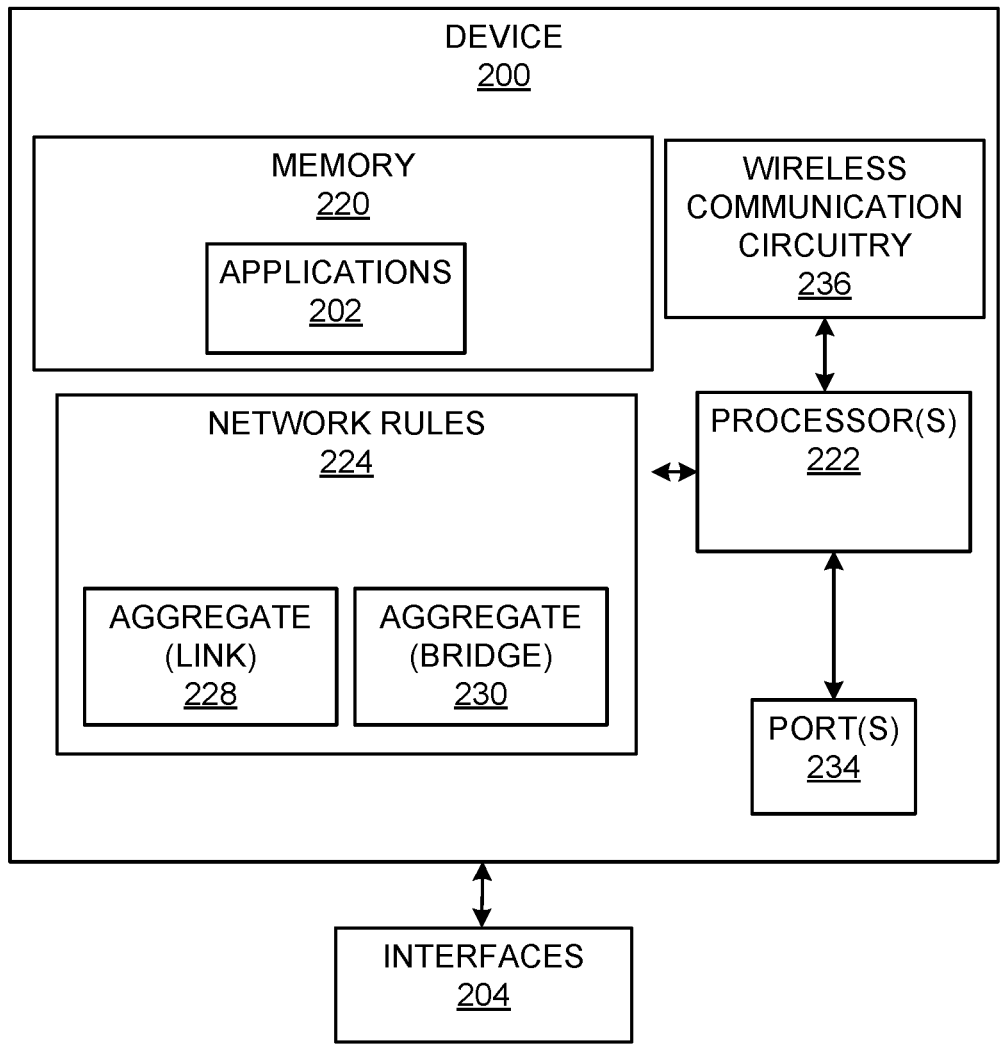
FIG. 2 illustrates a schematic diagram of a device, showing additional features, in accordance with aspects of the present disclosure.

Referring to FIG. 2, a device 200 includes a memory 220 and one or more processors 222 operatively coupled to the memory 220. The device 200 may be representative of other devices shown and described herein. The memory 220 may include read-only memory (RAM) and random access memory (ROM). The one or more processors 222 may include control circuits including one or more microcontrollers, a central processing unit, application-specific integrated circuits, or a combination thereof. As shown, the device 200 is connected (physically or virtually) to interfaces 204, and the one or more processors 222 can obtain data for the interfaces 204. The data may include the number of interfaces, type of each interface, or a combination thereof, as non-limiting examples. While the data for the interfaces 204 can be stored on the memory (not shown in FIG. 2) of a device, in some embodiments, the interfaces 204 are configured to be implemented on hardware, software, or firmware.

As shown, the memory 220 stores applications 202. In this regard, the one or more processors 222 can obtain data that includes the applications 202. Additionally, the data may include the number of applications, type of each application, or a combination thereof, as non-limiting examples. While the applications 202 are stored on the memory 220 and implemented in software, in some embodiments, the applications 202 are configured to be implemented on hardware, software, or firmware. Each application of the applications 202 stores executable instructions that can be executed by the one or more processors 222.

The device 200 can receive network rules 224 and store the network rules 224 on the memory 220. The network rules 224 may be created by, for example, a user of the device 200 for one or more user-defined purposes. For each application of the applications 202, the network rules 224 may include at least one network rule for the application, with the network rule specifying which interface(s), from the interfaces 204, can be accessed by an application of the applications 202.

The network rules 224 may represent a combination of an auto network rule and customized network rules that grant specific applications with access to one or more specific interfaces in communication with the device 200, with the specific applications and interfaced specified by the one of the rules. At least one of the network rules 224 may be assigned to applications and interfaces, or conversely, applications and interfaces may be assigned at least one of the network rules 224. The one or more processors 222 of the device 200 can manage network access between the applications 202 and the interfaces 204, based on the network rules 224. Additionally, the network rules 224 may include various user-defined features that, in some instances, can be used with multiple different network rules. For example, the network rules 224 may include one or more shared rules that can be created, stored, and used/re-used by additional network rules that are created. Alternatively, or in combination, the network rules 224 may include one or more reserve rules. When a network rule with a reserve rule is assigned to an application and an interface, the application represents the only application that can access the interface. A reserve rule may limit data transmission from a single application to a single interface, or vice versa. Beneficially, a reserve rule may be incorporated with a malware or content analysis application, allowing the application to receive data from a virtual interface that is separate from secure, enterprise data.

The network rules 224 may include a link aggregation 228 (AGGREGATE (LINK)). The link aggregation 228 may include a link that groups two or more interfaces together and can be stored and added to a network rule. When a link aggregation 228 is created and groups interfaces together, additional network rules can also use the link aggregation 228 for additional, newly created network rules, thereby allowing multiple applications to access the same grouped interfaces, including simultaneous access to the interfaces, based on the link provided by the link aggregation 228. Beneficially, multiple, similar link aggregations can be created and used as different channels for transmitting data packets to the interfaces, which may increase bandwidth.

Additionally, the network rules 224 may include a bridge aggregation 230 (AGGREGATE (BRIDGE)). The bridge aggregation 230 may include a bridge that groups two or more interfaces together and can be stored and added to a network rule. However, the bridge aggregation 230 can provide additional protocol that allows the application (to which the bridge aggregation 230 is assigned as part of a network rule) to serve as an intermediary and to monitor data packets sent from one interfaces of the bridge aggregation 230 to another interface of the bridge aggregation 230 based on the bridge. In this regard, the application can regulate and determine whether to allow the data packets to pass between interfaces. Beneficially, the bridge aggregation 230 can monitor and regulate data from one interface to another for a variety of purposes. Due in part to the application making decisions as to data transfer, the bridge aggregation 230 may be used by a single application at a time, but can later be used by another application at another time so long as the bridge aggregation 230 is used by only one application at a time.

Depending upon the desired user settings, a network rule with a link aggregation 228 may be established as a shared rule or a reserve rule. Also, a network rule with a bridge aggregation 230 may also be established as a reserve rule.

To communicate with interfaces, the device 200 may include one or more ports 234. The one or more ports 234 may include Ethernet ports, Universal Serial Bus (USB) ports, USB-C ports, or a combination thereof, as non-limiting examples. In this manner, the device 200 can communicate with the interfaces 204 using the one or more ports 234. Alternatively, the device 200 may include wireless communication circuitry 236 designed to send and receive data through a wireless communication protocol, such as a cellular network, a wireless local area network (LAN), or a WIFI® network, to communicate with the interfaces 204. Accordingly, the wireless communication circuitry 236 may include a controller(s) and an antenna(s).

Figure 3:
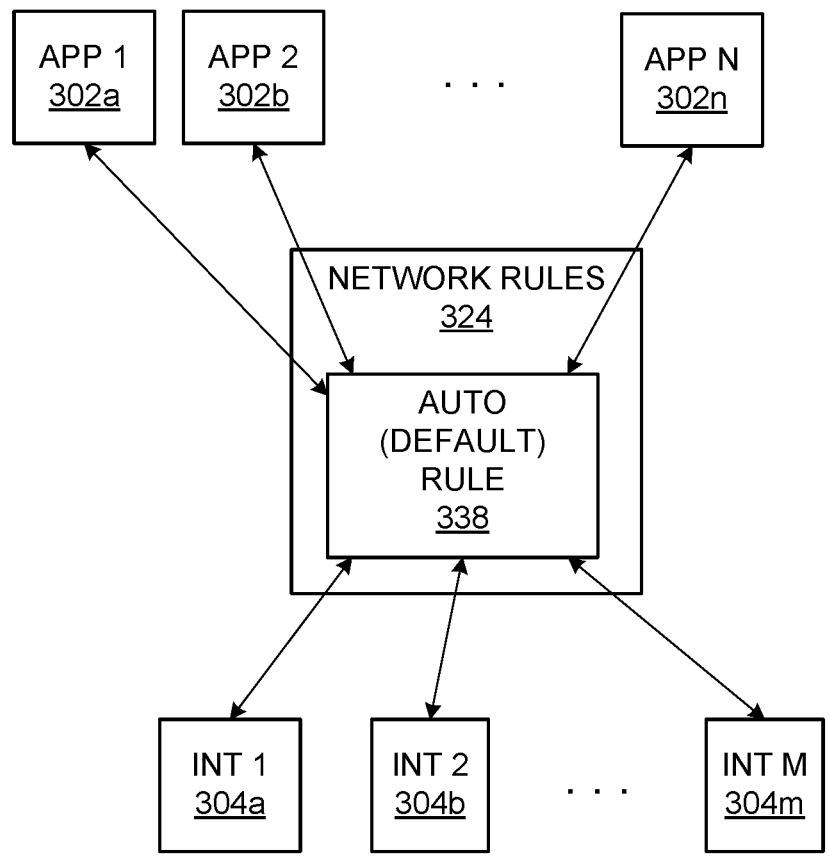
FIG. 3 illustrates a schematic diagram of an auto network rule when a device is initialized, in accordance with aspects of the present disclosure.
Figure 4:
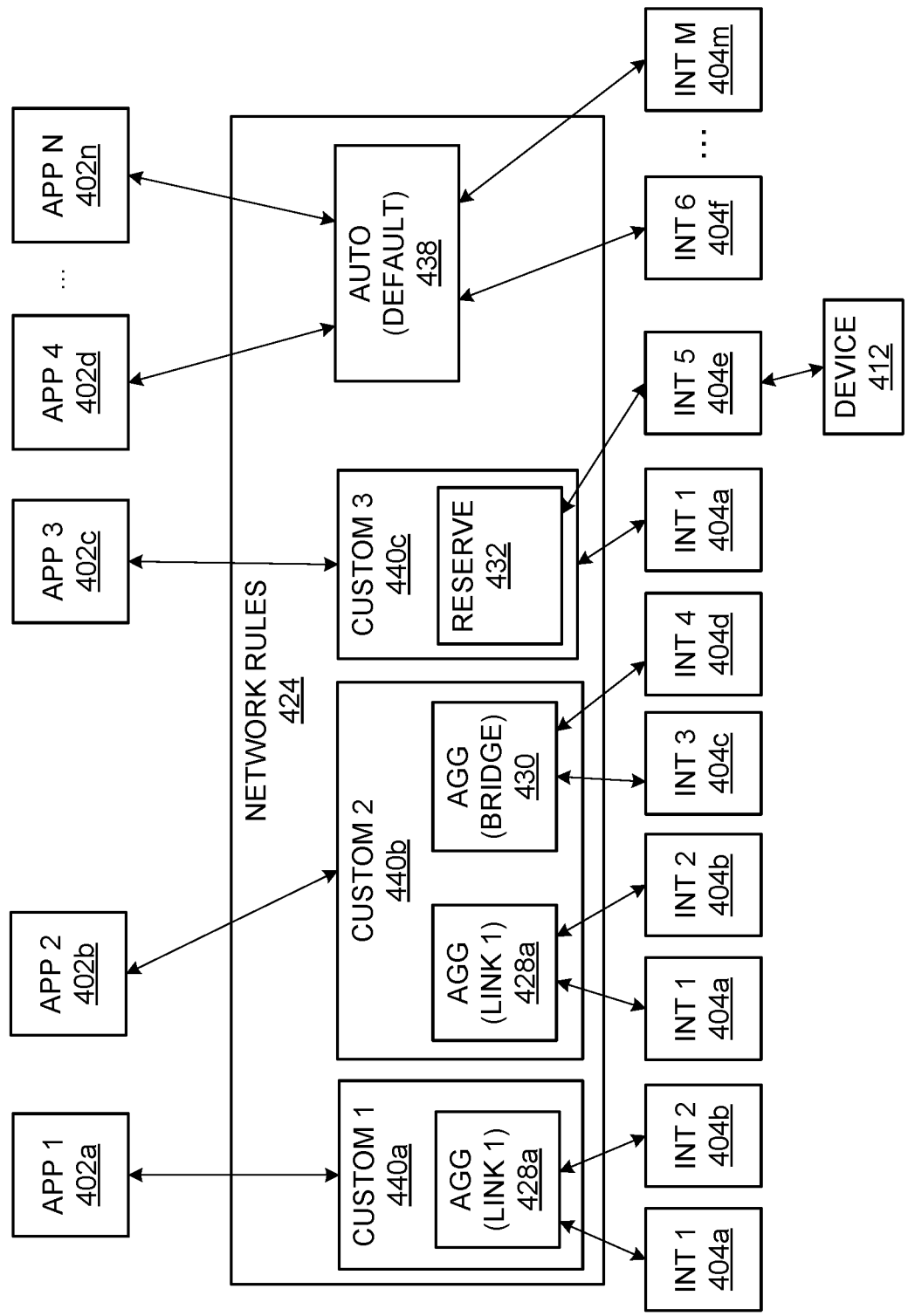
FIG. 4 illustrates a schematic diagram of a device that is programmed with various customized network rules, in accordance with aspects of the present disclosure.

Referring to FIG. 3, network rules 324 for applications running on a device (not shown in FIG. 3) include an auto network rule 338. The auto network rule 338 may include an initial, default rule prior to establishing additional rules of the network rules 324. As shown, an application 302a (APP 1), an application 302b (APP 2), and an application 302n (APP N) represent n applications, each of which is assigned to the auto network rule 338. Also, an interface 304a (INT 1), an interface 304b, and an interface 304m (INT M) represent m interfaces (physical and/or virtual interfaces), each of which is assigned to the auto network rule 338. Accordingly, each of the n applications can access each of the m interfaces.

However, when new network rules are created, some of the interfaces may be removed from an auto network rule. For example, referring to FIG. 4, network rules 424 are established for several applications and interfaces. Although not shown, a device can run each of the applications and can be connected to each of the interfaces shown and described in FIG. 4.

As shown, the applications include an application 402a (APP 1), an application 402b (APP 2), an application 402c (APP 3), an application 402d (APP 4), and an application 402n (APP N), thus representing n applications. Each application of the n applications may represent a network function that can run on a device. Additionally, an interface 404a (INT 1), an interface 404b (INT 2), an interface 404c (INT 3), an interface 404d (INT 4), an interface 404e (INT 5), an interface 404f (INT 6), and an interface 404m (INT M) represent m interfaces (physical or virtual).

Each of the applications is assigned a network rule from the network rules 424, with the network rules 424 having several customized network rules. For example, the application 402a is assigned a customized rule 440a (CUSTOM 1) that includes a link aggregation 428a (AGG LINK 1) that links the interface 404a together with the interface 404b. Thus, the application 402a is granted network access to the interfaces 404a and 404b. Additionally, the application 402b is assigned a customized rule 440b (CUSTOM 2) that also includes the link aggregation 428a. In this regard, the link aggregation 428a represents a shared rule that is shared by the customized rules 440a and 440b. Accordingly, both of the applications 402a and 402b can access the interfaces 404a and 404b. While not specifically shown, the link aggregation 428a can be shared again. Put another way, additional rules (e.g., customized rules) can include the link aggregation 428a thus allowing an additional applications to access the interfaces 404a and 404b.

Additionally, the customized rule 440b includes a bridge aggregation 430 (AGG (BRIDGE)) that links together the interfaces 404c and 404d. The customized rule 440b not only grant network access by the application 402b to the interfaces 404c and 404d, but the bridge aggregation 430 also allows the application 402b to be an intermediary between the interfaces 404c and 404d, thus allowing the application 402b (based on the bridge aggregation 430) to regulate transmission of data packets between the interfaces 404c and 404d. Also, based on the interfaces 404c and 404d being linked to the bridge aggregation 430, applications other than the application 402b may not, in some instance, be able to access the interfaces 404c and 404d. However, when the application 402b is inactive, the customized rule 440b may be modified to remove the bridge aggregation 430, and another customized rule may use the bridge aggregation 430.

The application 402c is assigned a customized rule 440c. As shown, the interface 404a (representing a single interface) is linked to the customized rule 440c, thus granting network access by the application 402c to the interface 404a. Alternatively, in some embodiments, the interface 404a is precluded from being added to the customized rule 440c due in part to the interface 404a already being part of an aggregation (e.g., the link aggregation 428a). Also, the customized rule 440c includes a reserve rule 432 that is linked to the interface 404e. As a result, the interface 404e is reserve for the application 402c, and only the application 402c, and no other applications shown in FIG. 4, can access the interface 404e. Moreover, based on the reserve rule 432, any other rule that is either created or changed may not be configured to include network access by another application to the interface 404e. Put another way, the reserve rule 432 prevents a newly created or changed rule from adding the interface 404e.

As further shown, the interface 404e is connected (physically or virtually) to a device 412, thus allowing the application 402c to communicate with the device 412. Based on the reserve rule 432, only the application 402c can communicate with the device 412 and the other applications shown in FIG. 4 cannot access the device 412. It should be noted that any one or more the m interfaces may be connected to a device in a manner similar to what is shown.

Also, the remaining applications (i.e., applications 402d through 402n) are assigned to the auto rule 438 by default. Although not shown, prior to the creation of the customized rules 440a, 440b, and 440c, the applications 402a, 402b, and 402c are also assigned to the auto rule 438. However, as the customized rules 440a, 440b, and 440c are created and the applications 402a, 402b, and 402c are assigned to the customized rules 440a, 440b, and 440c, respectively. Further, the applications 402a, 402b, and 402c may be unassigned by, for example, being automatically removed from the auto rule 438. Further, as new customized rules are created, at least some of the applications 402d through 402n may be removed from the auto rule 438 and assigned to a newly created rule.

Subsequent to creation of rules and aggregations, the rules and aggregations may be modified/edited or deleted in some instances. For example, editing a customized rule can add or delete a link to an interface. Similar modifications may be performed to the aggregations. For example, a link aggregation may add one or more interfaces if the one or more interfaces is/are not part of a bridge aggregation or part of a reserve rule. Additionally, in some instances, a customized rule or an aggregation can only be modified if the application(s) to which the customized rule or aggregation is assigned is not active/running on a device.

Figure 5:
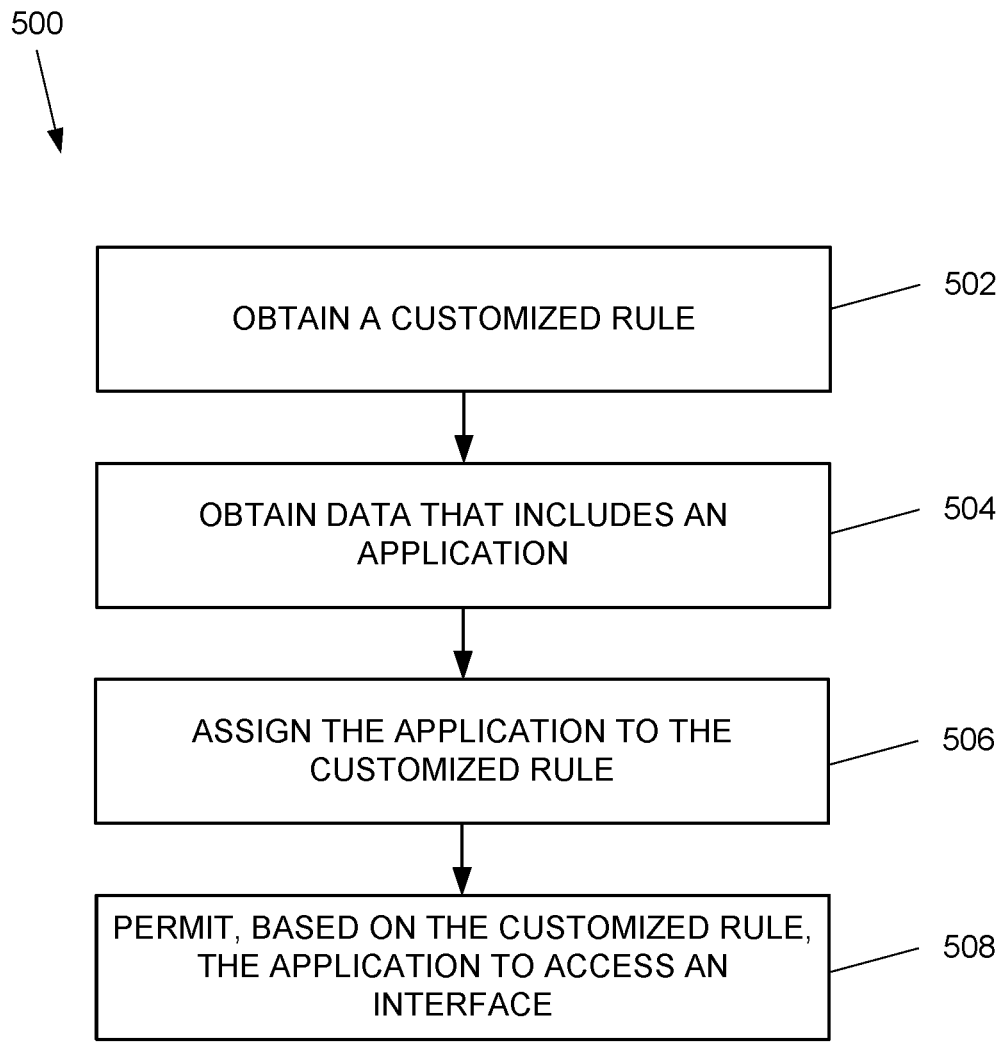
FIG. 5 illustrates a flowchart showing a method for managing access by an application to an interface, in accordance with aspects of the present disclosure.

Referring to FIG. 5, a flowchart showing a method 500 for managing access by one or more applications to one or more interfaces is shown. The method 500 may be performed by one or more processors on a device, in which the one or more processors carry out executable instructions stored on a memory. The method 500 may also be stored on a non-transitory, computer readable medium and executed by one or more processors. Further, the method 500 may be incorporated into a computer-implemented method.

In step 502, a customized rule is obtained. The customized rule may link one or more interfaces and may grant network access to application such that the application can access the one or more interfaces. The customized rule may include an aggregation, such as a link aggregation or a bridge aggregation described herein.

The process shown and described in step 502 may include multiple steps. For example, a first step can create a network definition, which includes one or more network rules as to what interfaces that network rule allows access to. Then, at a second step includes assigning which network rule an application uses. The assignment provides that application access to whatever interfaces the network rules allow. In some instances, the assignment may remove access from any interfaces associated with the previous network rule assigned to the application, if those interfaces are not included in the new network rule being assigned.

In step 504, data is obtained. The data may include an application. In some instances, the data includes one or more applications. The one or more applications may include an application stored, and capable of running on a device, such as a secure gateway application, a content analysis software application, or a malware analysis application, as non-limiting examples.

In step 506, the application to the customized rule is assigned. When the application is assigned to the customized rule, the customized rule can provide information to the application as to which interface(s) the application access. Also, prior to being assigned to the customized rule, the application may be assigned, by default, to an auto rule.

In step 508, the application is permitted to access an interface, based on the customized rule. In some embodiments, the customized rule includes a link aggregation that can subsequently be shared with one or more customized rules, thus allowing another application(s) to use the link aggregation and access the same interfaces. In some embodiments, the customized rule includes a bridge aggregation that allows the application to act as an intermediary between at least two interfaces linked to the bridge aggregation. In some embodiments, the customized rule includes a reserve rule that allows only the application to access the interface.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
a memory configured to store instructions;
one or more ports; and
one or more processors coupled to the memory, wherein the one or more processors, when carrying out the instructions, is configured to perform steps that include:
obtaining first data comprising one or more interfaces in communication with the device via the one or more ports, the one or more interfaces comprising a physical interface or a virtual interface that represents the physical interface;
obtaining second data comprising a first application and a second application, wherein the first application and the second application are configured to run on the device;
assigning a first network rule to at least one of the first application and the second application, the first network rule granting the first application access to the one or more interfaces and preventing access by the second application to the one or more interfaces; and
establishing, based on the first network rule, access to the one or more interfaces by the first application and the second application while preventing access by the second application to the one or more interfaces.

2. The device of claim 1, wherein the one or more processors is further configured to perform the steps that include, prior to obtaining the first network rule: obtaining a second network rule; and
using the second network rule to permit each application, including the first application and the second application, to access each of the one or more interfaces.

3. The device of claim 2, wherein the one or more processors is further configured to perform the steps that include, subsequent to obtaining the first network rule, removing the access to at least one interface of the one or more interfaces by one of the first application and the second application.

4. The device of claim 1, wherein:
the first network rule comprises an aggregation that forms a link between i) a first interface of the one or more interfaces and ii) a second interface of the one or more interfaces, and
managing the access comprises providing access, based on the link, to the first interface and the second interface by the first application and the second application.

5. The device of claim 1, wherein:
the first network rule comprises an aggregation that forms a bridge between i) a first interface of the one or more interfaces and ii) a second interface of the one or more interfaces, and
managing the access comprises the permitting, based on the bridge, the first interface to communicate with the second interface via one of the first application or the second application.

6. The device of claim 1, wherein:
obtaining the first network rule comprises obtaining a reserve rule for an interface of the one or more interfaces, and
managing, based on the reserve rule, the access to the interface only by the first application.

7. The device of claim 6, wherein managing, based on the reserve rule, comprises preventing the access to any of the one or more interfaces except for the first application.

8. The device of claim 1, wherein the one or more processors is further configured to perform the steps that includes editing the first network rule in response to the first application and the second application not running on the device.

9. The device of claim 1, wherein:
the first network rule grants access by the first application to an interface of the one or more interfaces; and
the access to the first application prevents the second application from access to the interface.

10. The device of claim 1, wherein:
the first network rule grants access by the first application to an interface of the one or more interfaces; and
the access to the interface allows access to a network appliance by the first application.

11. A device, comprising:
a memory configured to store instructions; and
one or more processors coupled to the memory, wherein the one or more processors, when carrying out the instructions, is configured to perform steps that include:
obtaining a network rule;
obtaining data comprising a plurality of interfaces in communication with the device via one or more ports, the one or more interfaces comprising a physical interface or a virtual interface that represents the physical interface
obtaining data that includes an application;
assigning the application to the network rule, the network rule granting the application access to an interface of the plurality of interfaces and preventing access by the application to another interface of the plurality of interfaces; and
permitting, based on the network rule, the application to access the interface while preventing access by the application to the another interface of the plurality of interfaces.

12. The device of claim 11, wherein the one or more processors is further configured to perform the steps that include, subsequent to obtaining the network rule, removing the application from a default network rule.

13. The device of claim 11, wherein:
obtaining the network rule comprises obtaining an aggregation linked to the interface and a second interface; and
permitting, based on the link aggregation, the application to access the interface and the second interface.

14. The device of claim 11, wherein:
obtaining the network rule comprises obtaining a reserve rule; and
permitting, based on the reserve rule, only the application to access the interface.

15. The device of claim 11, wherein:
obtaining the network rule comprises obtaining a bridge aggregation; and
permitting, based on the bridge aggregation, the application to act as an intermediary between the interface and a second interface.

16. A device, comprising:
a memory that stores instructions; and
one or more processors coupled to the memory, wherein the one or more processors, when carrying out the instructions, is configured to perform steps that include:
identifying a plurality of interfaces in communication with the device, each of the plurality of interfaces comprising a physical interface or a virtual interface that represents the physical interface obtaining a default network rule, wherein an application and a first interface of the plurality of interfaces are assigned to the default network rule, the default network rule granting the application permission to access the first interface;

obtaining a network rule, wherein a second interface of the plurality of interface is assigned to the network rule, the network rule granting the application access to the second interview while preventing access by the application to the first interface;

removing, based on the obtained network rule, the application from the default network rule, thereby removing access by the application to the first interface based on the default network rule; and assigning the application to the network rule, thereby allowing the application to access the second interface.

17. The device of claim 16, wherein the one or more processors is further configured to perform the steps that include assigning a second application to the default network rule.

18. The device of claim 16, wherein:
obtaining the network rule comprises obtaining a link aggregation linked to the second interface and a third interface; and permitting, based on the link aggregation, the application to access the second interface and the third interface.

19. The device of claim 16, wherein:
obtaining the network rule comprises obtaining a reserve rule; and permitting, based on the reserve rule, only the application to access the second interface.

20. The device of claim 16, wherein:
obtaining the network rule comprises obtaining a bridge aggregation; and permitting, based on the bridge aggregation, the application to act as an intermediary between the second interface and a third interface.

* * * * *